United States Patent [19]
Bidese

[11] Patent Number: 5,644,598
[45] Date of Patent: Jul. 1, 1997

[54] SWITCHING ARRANGEMENT FOR COUPLING A TRANSMITTING UNIT TO A TRANSMISSION LINE

[75] Inventor: Werner Bidese, Zurich, Switzerland

[73] Assignee: Siemens Schweiz AG, Zurich, Switzerland

[21] Appl. No.: 175,373

[22] PCT Filed: May 18, 1993

[86] PCT No.: PCT/CH93/00125

§ 371 Date: Jan. 11, 1994

§ 102(e) Date: Jan. 11, 1994

[87] PCT Pub. No.: WO93/25011

PCT Pub. Date: Dec. 9, 1993

[30] Foreign Application Priority Data

May 26, 1992 [CH] Switzerland ............... 01695/92

[51] Int. Cl.$^6$ ............... H04B 3/00; H04L 25/00
[52] U.S. Cl. ............... 375/258; 375/257; 375/304; 370/308; 333/154; 333/175
[58] Field of Search ............... 375/257, 304, 375/312, 352, 377, 258; 340/310 A, 310 R; 455/17, 26.1, 193.2, 191.3, 195.1; 370/51, 52; 333/154, 175

[56] References Cited

U.S. PATENT DOCUMENTS

| 1,808,894 | 6/1931 | Heising ............... 375/304 |
| 2,883,524 | 4/1959 | Deise et al. ............... 375/304 |
| 3,571,754 | 3/1971 | Healey ............... 331/116 |
| 3,754,187 | 8/1973 | Deming ............... 325/37 |
| 3,760,278 | 9/1973 | Narbaits-Jaureguy ............... 325/51 |
| 3,919,656 | 11/1975 | Sokal et al. ............... 330/51 |
| 3,967,202 | 6/1976 | Batz ............... 325/31 |
| 4,072,886 | 2/1978 | Dammeyer ............... 318/602 |
| 4,142,178 | 2/1979 | Whyte et al. ............... 375/7 |
| 4,319,224 | 3/1982 | Tappeiner et al. ............... 340/310 R |
| 4,339,827 | 7/1982 | Torres et al. ............... 455/188 |
| 4,392,225 | 7/1983 | Wortman ............... 370/75 |
| 4,455,674 | 6/1984 | Sano ............... 381/15 |
| 4,646,319 | 2/1987 | Engel et al. ............... 340/310 R |
| 4,916,380 | 4/1990 | Burroughs ............... 323/282 |
| 5,053,774 | 10/1991 | Schuermann ............... 342/44 |
| 5,300,904 | 4/1994 | Andersen ............... 375/304 |
| 5,327,337 | 7/1994 | Cripe ............... 363/134 |
| 5,450,088 | 9/1995 | Mei ............... 342/51 |

FOREIGN PATENT DOCUMENTS

| 1208715 | 7/1986 | Canada . |
| 0167234 | 1/1986 | European Pat. Off. . |
| 0417542 | 3/1991 | European Pat. Off. . |
| 2461564 | 7/1976 | Germany . |
| 2159022 | 11/1985 | United Kingdom . |

OTHER PUBLICATIONS

International Search Report and Annex.

*Primary Examiner*—Edward L. Coles, Sr.
*Assistant Examiner*—Madeleine Anh-Vinh Nguyen
*Attorney, Agent, or Firm*—Greenblum & Bernstein P.L.C.

[57] ABSTRACT

A switching arrangement is provided for coupling a transmitting unit to a transmission line. According to the present invention, a transformer is provided, whose secondary winding is a portion of the transmission line and whose primary winding is connected with the transmitting unit and integrated into a parallel resonance circuit, whose resonant frequency is tuned, each time, to the carrier frequency of the transmitted signal. In addition, a tuning unit may be provided for the automatic tuning of the parallel resonance circuit.

11 Claims, 2 Drawing Sheets

SWITCHING ARRANGEMENT FOR COUPLING A TRANSMITTING UNIT TO A TRANSMISSION LINE

FIELD OF THE INVENTION

The present invention pertains to a switching arrangement for coupling a transmitting unit to a transmission line.

BACKGROUND INFORMATION

For the supply or the removal of signals, connecting leads are often conductively connected with two wire conductors. During couplings of this type, in order to make contact it is necessary each time to remove or pierce the insulation layer of the two wire conductor. A multiple coupling of connecting leads results in damage to the two wire conductor. In addition, the unallowed coupling of unauthorized third parties onto the two wire conductor is easily feasible. In a telephone network utilizing conductive coupling, unauthorized parties can readily switch on. European Patent Publication No. EP-OS 0 417 542 discloses an apparatus for the inductive coupling of sending coils to a two conductor wire which largely eliminates such problems. Therein, a three-limbed ferrite core is utilized, whose yoke, for the insertion of the coupling coil or the two wire conductor is so pivotally arranged, that the two wires of the transmitting line accordingly pass through the center limb and one of the two outer limbs. For example, the coupling coil connected with the transmitting unit surrounds the center limb with several windings. For the transmission of information between two subscriber end units coupled to the transmission line, the transmitter generates a modulated high frequency signal to the primary coupling coil, which signal transforms the transformer, comprised of the coupling coil and the transmission line, and carries same, via the secondary-sided transmission line to the receiving end unit. The primary-sided perceived load Z1 of the transmitter ideally corresponds to the product of the secondary-sided contacting load Z2 and the square of the transmission ratio (N1/N2). Parallel thereto, the relatively small main inductivity of the transformer makes an appearance, which requires an amount of current which exceeds, many times, that of the transformed load or resistance Z1. The main capacity becomes particularly small if the secondary windings, formed via the transmission line, has only a few windings. The inductive coupling is thus problematic only for nonsystem-connected terminal units, which, for example, only have very low supply voltages available and which can supply only small outputs. Normally, with such terminal units only a limited range can be achieved, within which there is a satisfactory signal to noise ratio. If, for example, in order to increase the range, the output to the transmission line is increased, there is a reduction of the life span of the batteries that feed the terminal unit. In terminal units, powered by the network, a correspondingly larger dimensioned current supply unit would have to be provided.

SUMMARY OF THE INVENTION

The basis for the task of the present invention is to provide a switching arrangement which avoids the described disadvantages. Particularly, the range between the individual terminal units should be increased, the output removal of the terminal units should be reduced and the signal to noise ratio should be enhanced.

This task is achieved via the measures set forth in the specification and the characterizing portions of the claims.

Advantageous embodiments of the invention are also set forth in the specification and the claims.

By the use of the method of this invention and the switching arrangements of the present invention, the amount of current that must be fed to the coupling unit is greatly reduced, which is particularly favorable for non-system-connected operated terminal units. With the simultaneously reduced current supply, the output of the transmission line is increased. The quality of the transmitted signals is thus greatly enhanced.

BRIEF DESCRIPTION OF THE DRAWINGS

The invention will be described hereinafter in more detail, by way of example, with reference to the drawings in which.

DETAILED DESCRIPTION OF THE INVENTION

Figure 1:
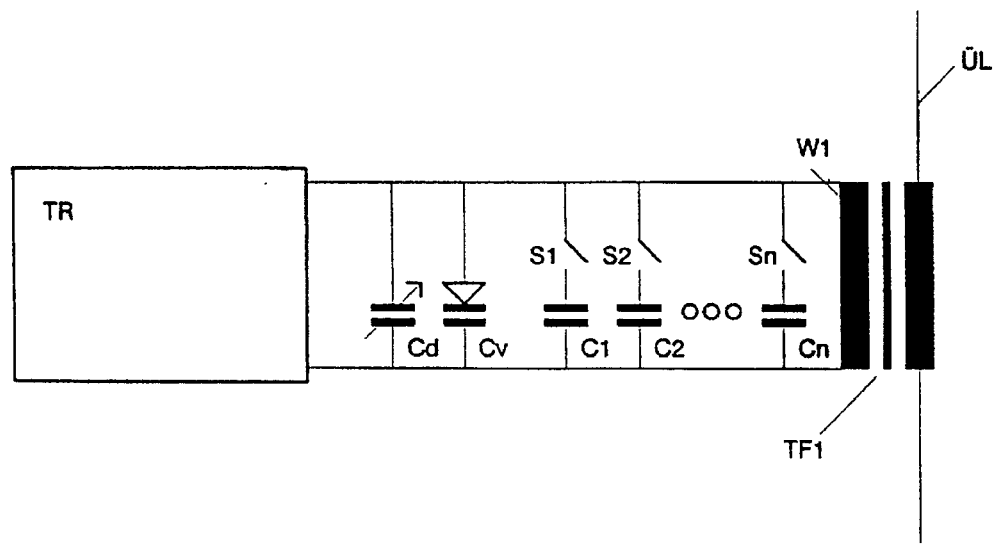
FIG. 1 illustrates a switching arrangement of the present invention with a transformer whose primary winding is interconnected with a transmitting unit.

FIG. 1 shows a transmitting unit TR, which is coupled to a coupling unit, that is the primary windings of a transformer TF1, to transmission Line ÜL, which forms the secondary winding of transformer TF1. This secondary winding normally includes only one winding. Transmission unit TR, which gives off a modulated high frequency signal, comprises, for example, a preamplifier and a final amplifier. The main inductivity resulting from the described details requires very high current, which via the generally utilized supply sources, particularly supply sources powered by batteries, cannot be extracted or not extracted for an extended period of time. This problem is solved via the hereinafter described utilization, as per this invention, of a passive current amplifier. The switching in of one or more capacitors C1, ..., Cn, via switch S1, ..., Sn, onto winding W1 forms a parallel resonance circuit, which can be tuned to a high and/or carrier frequency. The tuned resonance circuit acts in this manner as a pure resistance Rp. The current, which conforms to the quotient of voltage Ur and the effective resistance Rp achieves the minimum value at resonance. In the reactive impedance, at that time, resonance streams Ir are pulsating which achieve much higher values than the current I flowing in from the outside. Thus, with lesser power supplied from the outside, greater currents can be induced in the secondary windings. Of course, tuneable capacitors (variable capacitors Cd, capacitance diodes Cv, etc.) can also be advantageously utilized.

Figure 2:
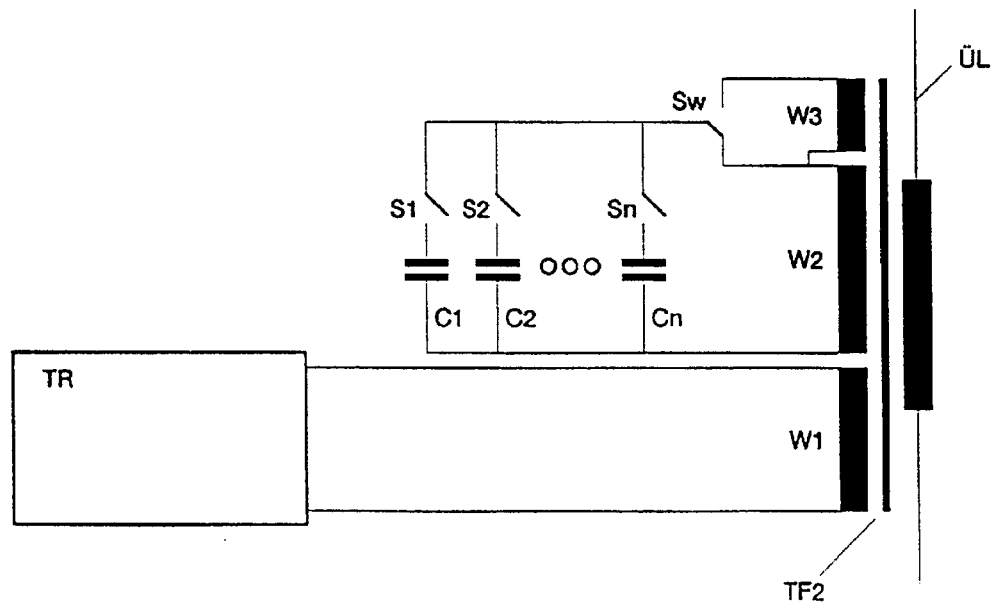
FIG. 2 illustrates a switching arrangement of the present invention with two primary-sided auxiliary windings.

In FIG. 2, transmitting unit TR is connected with a first spool, respectively, winding W1 of a transformer TF2. Via the use of spools, respectively windings W2, W3 of transformer TF2 and capacitors C1, ..., Cn, a tuneable parallel resonance circuit is formed on the primary side which is coupled in a transformer-type manner to winding W1. Capacitors C1, ..., Cn can be switched on upon demand. Winding W3 is provided for switching same, via switch Sw, onto winding W2 so that the resistance circuit is tuneable over a wider region. In this manner it can also be provided that winding W2 or winding W3 can singly, or that windings W2, W3, serially switched together, can be switched onto capacitors C1, ..., Cn.

Figure 3:
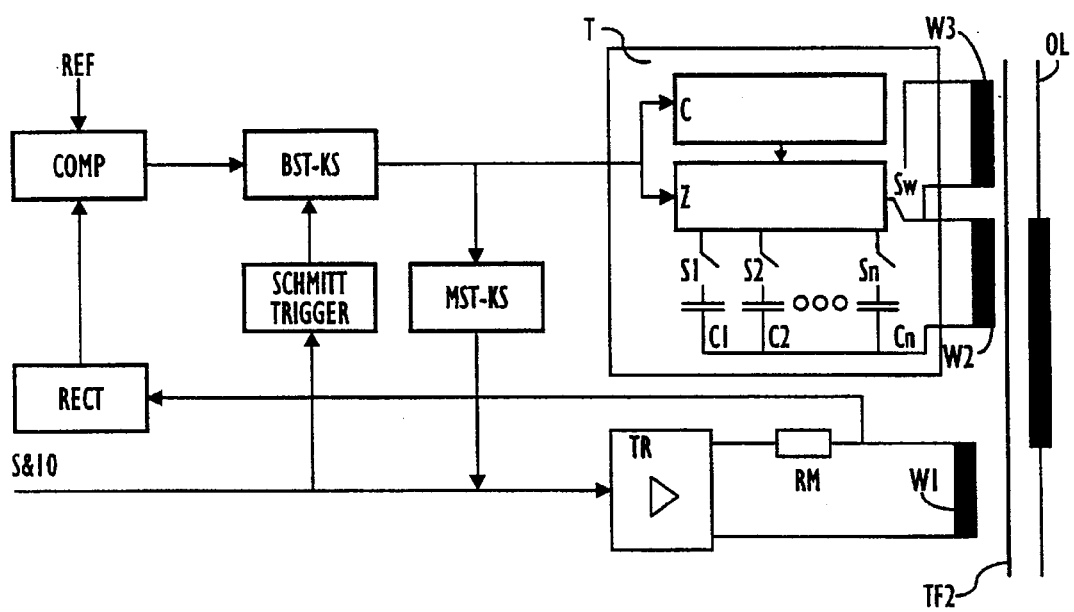
FIG. 3 illustrates a transmitting unit with a device for the automatic tuning of a resonating unit.

FIG. 3 shows a switching arrangement according to the present invention in which the parallel resonance circuit is automatically tuneable. The principal item of the switching unit is tuning unit T via which the capacitors C1, . . . , Cn and the windings W3 and/or W2 are thusly always switched on so that the resonance frequency of the resistance circuit continuously changes, until the switching unit takes notice that the carrier frequency is close enough to the carrier frequency of the sending signal. It has been found to be advantageous to maintain the current I, outgoing from transmitting unit TR to winding W1, and to modulate the resonance circuit, until current I is minimal or below a predetermined threshold value. The minimal value of current I, as per the previous explanation, always occurs when, at the sending unit, only the relatively high resistance Rp of the measurement circuit occurs. The minimal value of current I thus only occurs in the case of resonance. The illustrated switching arrangement is comprised of a bistable or flip flop toggle stage BST-KS whose outlet is connected with the inputs of a clock generator C and a counter Z, which are contained in tuning unit T. Transmitting unit TR is connected, via a resistance Ran, with winding W1 and the input of a rectifier stage RECT, whose output and a line REF, which includes a voltage threshold, are each connected with the input of a comparator COMP. The output of comparator COMP, as well as a signal and command line S&IO, connected to a non-illustrated control unit, each are also connected with the input of flip flop toggle stage BST-KS. The output of flip flop toggle stage BST-KS is additionally connected, via a monostable toggle stage MST-KS, with a control unit, respectively via line S&IO, via which the signals of the transmitting unit TR that are to be transmitted, are channelled thereto.

The switching arrangement of FIG. 3 functions as follows: A start signal for the tuning procedure is channelled to the flip flop toggle stage BST-KS via line S&IO, whereinafter clock generator C and counter Z, connected with toggle stage BST-KS, are activated. Counter Z, which receives timing signals from clock generator C, begins the counting procedure from an existing or freely chosen count of the counter. Counter Z can be a simple dual counter whose outlets switch, via switcher So, . . . , Sn, respectively Sw, capacitors C1, . . . , Cn or windings W3 and/or winding W2, onto the resonance circuit. Switches SO, . . . , Sn, respectively Sw, are, for example, activated via switching transistors. The capacitors C1, . . . , Cn and windings W are chosen corresponding to the value of the counter outputs, so that a uniform tuning procedure is achieved. Transmitting unit TR outputs, during the tuning procedure, a signal, having the desired carrier frequency, to winding W1. Via resistance Rm a voltage, proportional to current I, is tapped and channelled to the input of rectifier Stage RECT, which in turn channels a corresponding DC voltage to the input of comparator stage COMP. In case this voltage, close to resonance, is smaller than the voltage threshold delivered to comparator stage COMP, via line REF, a signal is sent to flip flop toggle stage BST-KS, whereafter the same is set back. Via the setback of flip flop toggle stage BST-KS, clock generator C and counter Z are stopped, so that the current count of the counter is retained. In addition, monostable toggle stage MST-KS is activated, which reports back the successful conclusion of the tuning procedure to the control unit, via lead S&IO. In order to reduce the number of connecting leads, the sending signal and the command signal are carried on only a single line. The signals are channelled to toggle stage BST-KS preferably via a Schmitt trigger, which transforms the incoming signal into a clean square wave signal. In the interest of simplicity, of course separate command leads can be used, which are separated from the sending signal leads.

Preferably, counter Z is connectable with a D/A converter, which outputs a voltage, proportional to the count of the counter, to a variable capacitor Cd, Cv.

In addition, for uses in the telephone field, normally a tuning arrangement is utilized not only for the voice channel but also for the signal channel. Generally, only a single frequency is assigned to the signal channel. In contrast thereto, the voice channel utilizes several carrier frequencies, which can be dispersed over a wide frequency region. This means that the resonance circuit of the voice channel must be tuneable over a wider region, which can be achieved through the potential switching on of windings W3 and/or W2. The signal channel and the voice channel therein include a switching arrangement which, in principle, corresponds to the arrangement shown in FIG. 3. Clock generator C can be jointly utilized for both channels, or switched on via an OR-gate. Also, the acknowledgement pertaining to the termination of the tuning procedure of the signal or voice channels can be accomplished via a joint line.

In addition, the tuning arrangement could be constructed with the aid of a microprocessor. Therewith however, a greater capacity would be required.

In case the transmitter is switched off upon the termination of a conversation, the count of the counter is retained. In addition, when, in place of transmitting unit TR, a substitute resistance is switched onto winding W1, the impedance ratios in transmission line UL remain constant.

I claim:

1. A switching arrangement for coupling a transmitting unit, that generates a signal to be transmitted, to a transmission line, comprising a transformer having a primary winding that is connected with the transmitting unit and a secondary winding that is part of the transmission line, and a parallel resonance circuit which is tuneable to a carrier frequency of the signal to be transmitted, the primary winding of the transformer being part of the parallel resonance circuit.

2. The switching arrangement of claim 1, wherein the parallel resonance circuit is tuneable in such a way that a voltage applied to the parallel resonance circuit achieves a predetermined maximum value or exceeds a predetermined threshold value.

3. The switching arrangement of claim 1, wherein the parallel resonance circuit comprises a plurality of capacitors that are selectively connected in parallel with the primary winding of the transformer.

4. The switching arrangement of claim 3, further comprising a tuning unit for tuning the parallel resonance circuit, a resistive element that is connected between the transmitting unit and the primary winding of the transformer for providing a voltage that is proportional to the current supplied to the parallel resonance circuit, a rectifier which rectifies the voltage applied to the parallel resonance circuit, and a comparator that is provided between the rectifier and the tuning unit for comparing an output voltage of the rectifier with a voltage threshold value and for stopping a tuning procedure by the tuning unit after exceeding the voltage threshold value.

5. The switching arrangement of claim 3, wherein the parallel resonance circuit further comprises a plurality of switches for selectively connecting the capacitors in parallel with the primary winding of the transformer.

6. The switching arrangement of claim 3, wherein the primary winding comprises one or more windings that may be selectively connected in series.

7. The switching arrangement of claim 1, wherein the parallel resonance circuit is tuneable in such a way that the current supplied to the parallel resonance circuit achieves a predetermined minimum value or is less than a predetermined threshold value.

8. The switching arrangement of claim 1, wherein the parallel resonance circuit comprises tuneable capacitors that are connected in parallel with the primary winding of the transformer.

9. A switching arrangement for coupling a transmitting unit, that generates a signal to be transmitted, to a transmission line, comprising:

- a transformer having a primary winding that is connected with the transmitting unit and a secondary winding that is part of the transmission line;
- a parallel resonance circuit which is tuneable to a carrier frequency of the signal to be transmitted, the primary winding of the transformer being part of the parallel resonance circuit;
- the parallel resonance circuit comprising a plurality of capacitors that are selectively connected in parallel with the primary winding of the transformer;
- a tuning unit for tuning the parallel resonance circuit;
- a resistive element that is connected between the transmitting unit and the primary winding of the transformer for providing a voltage that is proportional to the current supplied to the parallel resonance circuit;
- a rectifier which rectifies the voltage applied to the parallel resonance circuit;
- a comparator that is provided between the rectifier and the tuning unit for comparing an output voltage of the rectifier with a voltage threshold value and for stopping a tuning procedure by the tuning unit after exceeding the voltage threshold value; and
- a command line which is connected via a Schmitt-trigger with a first input of a flip flop toggle stage having a second input that is connected with an input of a monostable toggle stage, the monostable toggle stage also including an output that is connected with the command line;
- the resistive element being connected on one side with an output of the transmitting unit and on the other side with the primary winding and also being connected, via the rectifier, with a first input of the comparator having a second input that is connected with a reference line providing the voltage threshold value.

10. A switching arrangement for coupling a transmitting unit, that generates a signal to be transmitted, to a transmission line, comprising:

- a transformer having a primary winding that is connected with the transmitting unit and a secondary winding that is part of the transmission line;
- a parallel resonance circuit which is tuneable to a carrier frequency of the signal to be transmitted, the primary winding of the transformer being part of the parallel resonance circuit;
- the parallel resonance circuit comprising a plurality of capacitors that are selectively connected in parallel with the primary winding of the transformer;
- the tuning unit comprising a counter that is connected with a clock generator, the counter having outputs that are connected with control inputs of switching transistors for selectively connecting the capacitors and the windings to the parallel resonance circuit, such that the resonant frequency of the parallel resonance circuit changes corresponding to the result of a count of the counter.

11. The switching arrangement of claim 10, wherein the parallel resonance circuit further comprises tuneable capacitors that are connected in parallel with the primary winding of the transformer, whereby the resonant frequency of the parallel resonance circuit changes corresponding to the result of a control voltage applied to the tuneable capacitors in accordance with the count of the counter.

* * * * *